United States Patent
Hessling et al.

(10) Patent No.: US 7,920,872 B2
(45) Date of Patent: Apr. 5, 2011

(54) METHOD FOR THE TRANSMISSON OF LOCATION-RELATED INFORMATION

(75) Inventors: Matthias Hessling, Hildensheim (DE); Cornelius Hahlweg, Hamburg (DE); Ulrich Kersken, Diekholzen (DE)

(73) Assignee: Robert Bosch GmbH, Stuttgart (DE)

( * ) Notice: Subject to any disclaimer, the term of this patent is extended or adjusted under 35 U.S.C. 154(b) by 1005 days.

(21) Appl. No.: 10/540,419

(22) PCT Filed: Dec. 20, 2003

(86) PCT No.: PCT/DE03/04225
§ 371 (c)(1),
(2), (4) Date: Jan. 6, 2006

(87) PCT Pub. No.: WO2004/059253
PCT Pub. Date: Jul. 15, 2004

(65) Prior Publication Data
US 2006/0156338 A1    Jul. 13, 2006

(30) Foreign Application Priority Data

Dec. 24, 2002  (DE) .................................. 102 61 028

(51) Int. Cl.
*H04W 24/00*        (2009.01)
(52) U.S. Cl. ............... 455/456.1; 455/456.2; 455/456.3; 455/456.5; 455/456.6; 455/414.1; 701/201; 701/202; 701/208; 701/209; 701/210; 340/995.11; 340/995.12; 340/995.13; 340/995.1; 340/995.17; 340/995.19
(58) Field of Classification Search .................. 455/457, 455/405–409, 414.1–414.4, 456.1–456.6; 340/988, 989, 990, 991, 995.1, 995.11, 995.12, 995.17, 995.18, 995.19; 701/200, 201, 202, 203, 204, 205, 206, 207, 208, 117, 209, 118
See application file for complete search history.

(56) References Cited

U.S. PATENT DOCUMENTS

| | | | | |
|---|---|---|---|---|
| 6,249,740 | B1 * | 6/2001 | Ito et al. ........................ | 701/200 |
| 6,292,743 | B1 * | 9/2001 | Pu et al. ........................ | 701/202 |
| 6,438,489 | B1 * | 8/2002 | Greif ............................. | 701/209 |
| 6,519,526 | B1 * | 2/2003 | Adachi et al. ................. | 701/208 |
| 6,519,528 | B2 | 2/2003 | Endo et al. | |
| 6,563,459 | B2 * | 5/2003 | Takenaga ................... | 342/357.1 |
| 6,571,173 | B1 * | 5/2003 | Joshi ............................ | 701/207 |
| 6,680,919 | B1 * | 1/2004 | Rauhala ....................... | 370/310 |
| 6,687,611 | B1 | 2/2004 | Hessing et al. | |
| 6,853,913 | B2 * | 2/2005 | Cherveny et al. ............. | 701/208 |
| 6,970,786 | B2 * | 11/2005 | Hayama et al. .............. | 701/209 |
| 7,006,037 | B2 * | 2/2006 | Kim ........................ | 342/357.09 |
| 7,027,915 | B2 * | 4/2006 | Craine ......................... | 701/117 |
| 7,243,355 | B2 * | 7/2007 | Espino ......................... | 719/328 |
| 2001/0018636 | A1 * | 8/2001 | Mizuno ........................ | 701/207 |
| 2002/0170056 | A1 * | 11/2002 | Akiyama et al. ............... | 725/35 |
| 2002/0183923 | A1 | 12/2002 | Hessing et al. | |

(Continued)

FOREIGN PATENT DOCUMENTS

CN        1272657      10/2000
(Continued)

*Primary Examiner* — Charles N. Appiah
*Assistant Examiner* — Olumide T Ajibade-Akonai
(74) *Attorney, Agent, or Firm* — Kenyon & Kenyon LLP

(57) ABSTRACT

The supplementary location-related information which may be included in a digital map of the receiver is transmitted in such a way that the location-related information may be downloaded from an Internet page.

13 Claims, 4 Drawing Sheets

U.S. PATENT DOCUMENTS

2003/0083809 A1 * 5/2003 Hatano .................. 701/207

FOREIGN PATENT DOCUMENTS

| | | |
|---|---|---|
| CN | 1358293 | 7/2002 |
| DE | 19942524 | 9/1999 |
| DE | 10004966 | 4/2000 |
| DE | 100 09 149 | 3/2001 |
| DE | 100 38 343 | 8/2001 |
| DE | 100 38 343.2 | 8/2001 |
| DE | 100 23 309 | 11/2001 |
| EP | 1 122 518 | 8/2001 |
| EP | 1122518 | 10/2001 |
| EP | 1224845 | 7/2002 |
| JP | 2000 48039 | 2/2000 |
| JP | 2000048039 A * | 2/2000 |
| JP | 2001041757 | 2/2001 |
| JP | 2002 267 458 | 9/2002 |
| JP | 2002267458 | 9/2002 |
| WO | 00/74019 | 12/2000 |
| WO | WO 01/18769 | 3/2001 |

* cited by examiner

```
23  30  31  17  20  17  17  39  60  59  43
20  49  35  28  34  43  53  36  44  41  11
41  88  87  53  54  48  28  15  33  34  17
52 (97) 96  23  17  18  19  20  37  35  18
16  38  52  31  12  15  17  15  30  27  10
14  33  33  36  25  16  17  14  29  26  10
15  30  30  29  27  21  18  14  25  20   9
14  24  25  28  30  28  18  13  22  20  10
17  23  24  29  25  34  27  14  22  19  10
16  22  20  27  29  36  31  20  21  19  13
15  20  20  29  27  37  35  23  19  18  13
```

| n | AdK$_{gef,n}$ |
|---|---|
| 1 | {} |
| 2 | {} |
| 3 | {} |
| 4 | {} |
| 5 | {} |
| 6 | {39} |
| 7 | {40, 41} |
| 8 | {41} |
| 9 | {42, 43} |
| . | |
| . | |
| 21 | {69} |
| 22 | {71, 72} |
| 23 | {73} |
| 24 | {86} |
| 25 | {86, 87} |
| ... | |

| SE | M_SE | Cum_sum |
|---|---|---|
| 1 | 5 | 5 |
| 2 | 9 | 14 |
| 3 | 14 | 28 |
| 4 | 7 | 35 |
| 5 | 8 | 43 |
| 6 | 22 | 65 |
| 7 | 4 | 69 |
| 8 | 6 | 77 |

METHOD FOR THE TRANSMISSON OF LOCATION-RELATED INFORMATION

FIELD OF THE INVENTION

The present invention relates to a method for transmitting location-related information from a transmitter to a receiver.

BACKGROUND INFORMATION

German patent application documents nos. 199 42 524.8, 100 09 149.0, 100 04 966.4, 100 38 343.2, and 100 23 309 relate primarily to methods and/or systems that make it possible to insert location-related information not present in a digital map into the map. The location-related information may be linear or planiform objects. Examples include ends of traffic jams, parking garages, or side roads, which are not recorded in a digital map.

The focus of these applications is on the method for encoding and decoding objects. In this connection, the encoding of objects is understood to be:

surrounding the objects with location information and descriptive information, marking of relevant objects, creating assignment information for assigning the descriptive information to the location information, transferring the objects into suitable coordinate chains, or, more generally, the location-related information into a data record, displaying the location-related information in a suitable format, including information concerning structure and interpretation.

Embodiments may also include only a portion of these steps.

In a standardized configuration, for example, information concerning structure and interpretation of the data may be unnecessary.

In this connection, the decoding of objects is understood to be:

comparing the geometric information of the supplementing data record and the data record to be supplemented, a suitable method being used, inserting the supplementary objects into the data record to be supplemented.

SUMMARY OF THE INVENTION

An object of the exemplary embodiment and/or exemplary method of the present invention is to provide a method for transmitting the supplementary location-related information from a transmitter to a receiver. A method of the five patent applications cited above may be used, for example, for encoding and decoding.

The object according to the exemplary embodiment and/or exemplary method of the present invention is achieved in each case by the features described herein.

The transmission method of the present invention is advantageous in particular with respect to the marketing of the supplementary location-related information. The supplementary, location-related information is downloaded from an Internet page. As a rule, the special path of the information provision allows the participation of three parties. In the following, these parties are representatively described as information provider, service provider, and user.

The service represents encoding of the location-related information of the service provider. The three parties may appear in different constellations, which are tailored to different financing possibilities of the service. The encoding and decoding methods, which may be applied in the method of the present invention for transmitting location-related information from a transmitter to a receiver, are explained in patent applications 199 42 524.8, 100 09 149.0, 100 04 966.4, 100 38 343.2, and 100 23 309.

It is a particular advantage that the exemplary embodiment and/or exemplary method of the present invention makes various business models possible for providing location-related information on the Internet. The exemplary embodiment and/or exemplary method of the present invention makes it possible for an information provider such as a restaurant, a movie theater, a company, or another commercial or private institution to provide location-related information on its Internet site in order to make it easier for customers to reach it. In this case, the information provider pays for the encoding of the location-related information and for the corresponding Internet product. This product on the Internet page of the information provider may also be counterfinanced entirely or in part by advertising.

Another business model is that the information provider does not encode the location-related information and provide it on the Internet but instead turns this over to a service provider. In this case, a link to the page of the service provider may be set up on an Internet page of the information provider. By selecting this link, a customer of the information provider reaches the Internet page of the service provider in order to download the desired location-related information. For this service, the information provider pays the service provider a flat rate or a use-based fee. As an alternative or in addition, it is possible in this business model to at least partially counterfinance the service of the service provider through advertising on the service provider's Internet page.

Another business model is that the service provider makes a fee-based portal available from which end customers are able to download location-related information concerning, for example, points of interest, for a fee.

Furthermore, the methods for encoding and decoding and, based on these, the method of the present invention for transmitting location-related information from a transmitter to a receiver, are explained below in greater detail.

DETAILED DESCRIPTION

Figure 1:
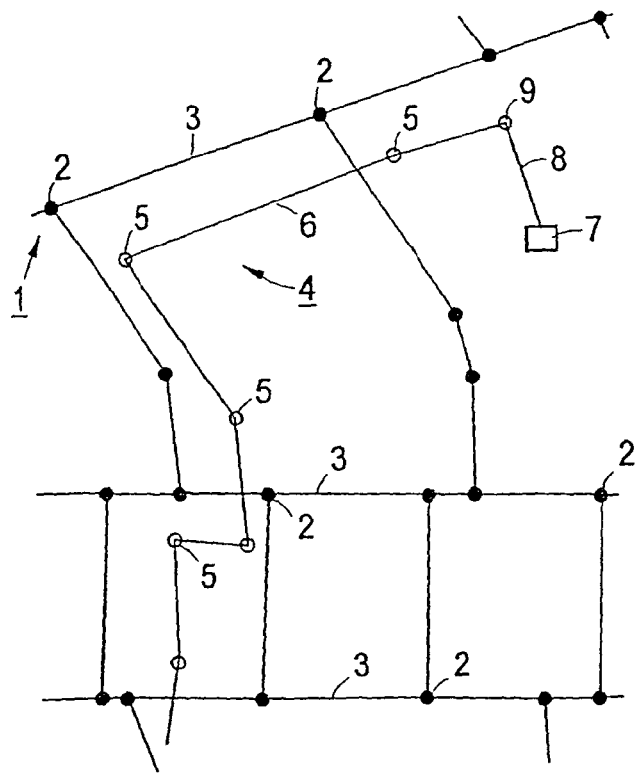
FIG. 1 shows a segment of a road map and a received object to be decoded.

FIG. 1 shows a segment from a digital map stored in the receiver including a road network 1, interpolation points 2 being stored as vectors with information connecting interpolation points 2 with each other by stretch elements 3. An object 4 to be encoded is made up of a polyline having interpolation points 5 and stretch elements 6. In addition, the object to be encoded has an endpoint 7 which is connected to the adjacent interpolation point 9 via a stretch element 8. As seen in FIG. 1, stretch line 5, 6 is distinguished from a portion of road network 1 only by a parallel shift. This may be caused, for example, by the use of different geographical coordinates in the transmitter and receiver.

Figure 2:
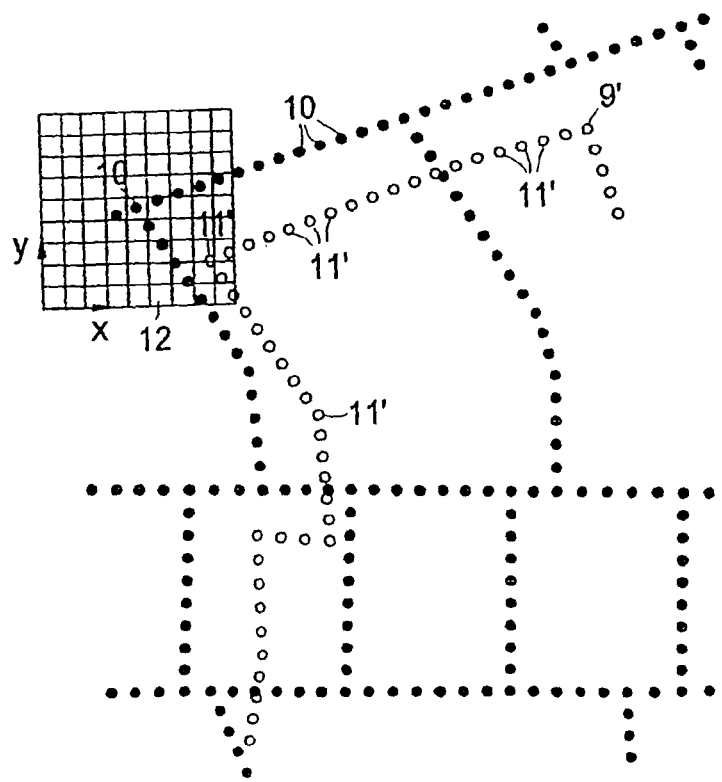
FIG. 2 shows a representation of the objects according to FIG. 1 converted into a scatter plot.

In an exemplary embodiment of the present invention, the object to be encoded includes traffic routes having characteristic properties which are also present on the receiver's digital road map. In an exemplary embodiment of the present invention, road network 1 and object 4 for encoding are depicted by equidistant points 10, 11 (FIG. 2). This is done by interpolation, in the simplest case by successive addition of differential displacement vectors. The interpolation distances are equal in each case. Obtained points 10, 11 are stored.

A data format is described in patent application no. 100 23 309. The database separately includes both location as well as descriptive information. Assignment information is used for assigning at least one portion of the location information to at least one portion of the descriptive information. Structural information and interpretation rules, if necessary, are located in a header part. In another embodiment of the present invention, the addresses of the original stretch elements are included in a suitable manner so that a memory space-saving list of the original addresses of the stretch elements and the offsets of the interpolation points is present in the memory within the particular point set.

The point set derived from traffic route network 1 is denoted as K in the following. For the purpose of decoding, the number of points of the traffic route network which lie within a predetermined distance of at least one point of object 4 may be determined for a plurality of relative positions of the point set of object 4 with respect to traffic route network 1. It is assumed that only a slight displacement takes place between the traffic route network and object 4.

The point set of object 4 is used as filter mask F (example in FIG. 5), a capture radius r being assigned to each of points 11. Furthermore, the filter mask is displaced in the x and y direction, as is suggested by a grid 12 in FIG. 2. A check is made at each point of displacement (x, y) to determine if one or a plurality of points $K_m$ of point set K lie within a circle having radius r about a point $F_n$ of filter mask F, i.e., if the condition $$\lfloor |F_{x,y,n} - K_m| \le r \rfloor = \{0; 1\}$$

is met. The points of the road network that lie within capture radius r of at least one point of object 4 are denoted in the following as captured points. By adding up the results, the total number of the captured points is determined according to the following equation:

$$GP_{x,y} = \sum_n \sum_m \lfloor |F_{x,y,n} - K_m| \le r \rfloor$$

Figures 3, 4:
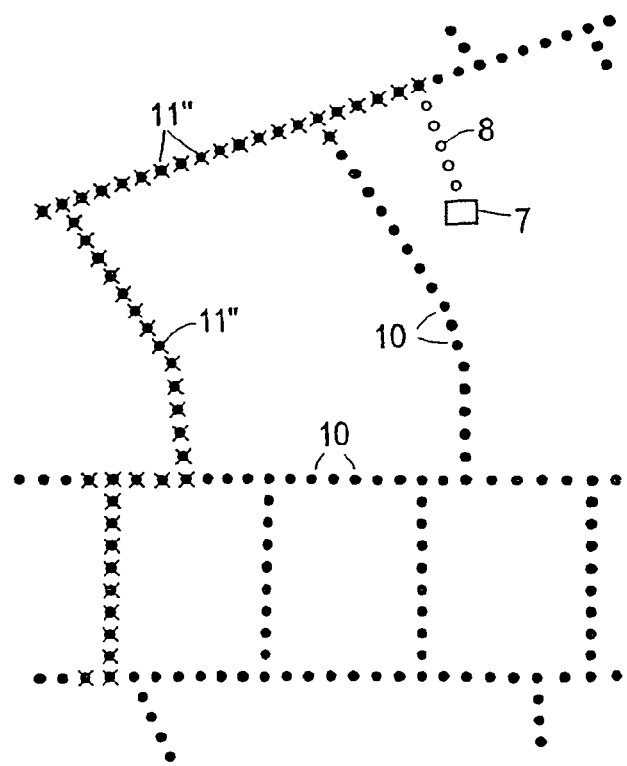
FIG. 3 shows a matrix of the number of captured points.
FIG. 4 shows the adjusted scatter plot of the object to be decoded and the scatter plot of the products from the database.

In doing this, the table shown in FIG. 3 is obtained, in which it is determined that the largest number, namely 97, is present in the displacement "$x_{max}=1$" and "$y_{max}=8$". The coordinate chain is decoded in the relative position in which the total number is largest. FIG. 4 shows a scatter plot of road network 1 and of object 4 to be decoded which is displaced by $x_{max}$ and $y_{max}$, the points correlating with the points of the road network being highlighted by Xs.

After this process, it is possible to check the plausibility of the obtained displacements. To that end, only the captured points must be checked for partial consistency of their chaining, which is the result, for example, of a bit mask of the affected stretch line being run via an And function and gaps (coherent regions of non-captured points) being detected.

If necessary, a precision correction may be performed through another step, to which end the already displaced filter mask is displaced in smaller steps so that the sum of the squares of the absolute value of the vector sums of the difference vectors of the individual points of the filter mask is minimized to the captured points of the road network. In the event of only one captured point per point of the filter mask, the result is the usual minimum error square. A plurality of captured points results in the mask being "suspended" into the point set of the road network in an optimum manner.

In detail, this takes place as follows: The filter mask impacted by the roughly determined displacement is again correlated with the points of the road network, the arrays (with size of (F)=N) of vector sums V and the number of captured points G being output. Correction displacement d must subsequently be determined according to the extremal requirement $$\sum_n^N \left\| \left( F_n + d - (1/G_n) \cdot \sum_n^{G_n} K_{gef,n} \right) \right\| \to \text{Min}$$

and after formation of the partial derivation $$\partial(\ldots)/\partial t = \sum_n^N (d + V_n/G_n) = 0$$

the following results $$d = -(1/N) \sum_n^N (V_n/G_n)$$

Case $G_n=0$ is excluded, which may occur, for example, by first initializing vector sums $V_n$ with 0 and if $G_n=0$ is set, $G_n=1$ and N=N−1.

If a filter mask is finally displaced, the captured points may be determined individually, to which end it is determined for the individual filter points which point of the road network correlates therewith. The result of such a process is shown as a table in FIG. 6. This shows that points $F_1$ through $F_5$ are without a corresponding point on the road network. This shows that this stretch element of the filter mask has not been entered in the receiver's database. It may be connected thereto at point 39 of the road network.

Figures 5, 6, 7:
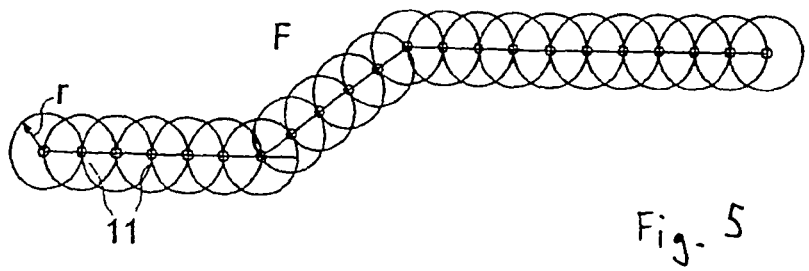
FIG. 5 shows a filter mask derived from an object to be decoded.
FIG. 6 shows a table which contains captured points along the decoded object.
FIG. 7 shows a table for assigning the points to stretch elements.

A reference of the elements of point set K to the stretch elements of the road network is explained, for example, in the following: SE signifies the number of the stretch element, the sequence being determined according to the transformation into point set K, which occurs in a defined direction. M_SE represents the number of points of stretch element SE after interpolation. The reference of a captured point (with address m) to the associated stretch element may now occur through a simple formation of the cumulative sum of M_SE-gap in that starting from SE=1, the m to be referenced is investigated for the condition m≦cum_sum (M_SE) and first stretch element SE fulfilling the condition is assigned. FIG. 7 shows that it is sufficient to file an array of the cumulative sum for 1 through SE.

Figure 8:
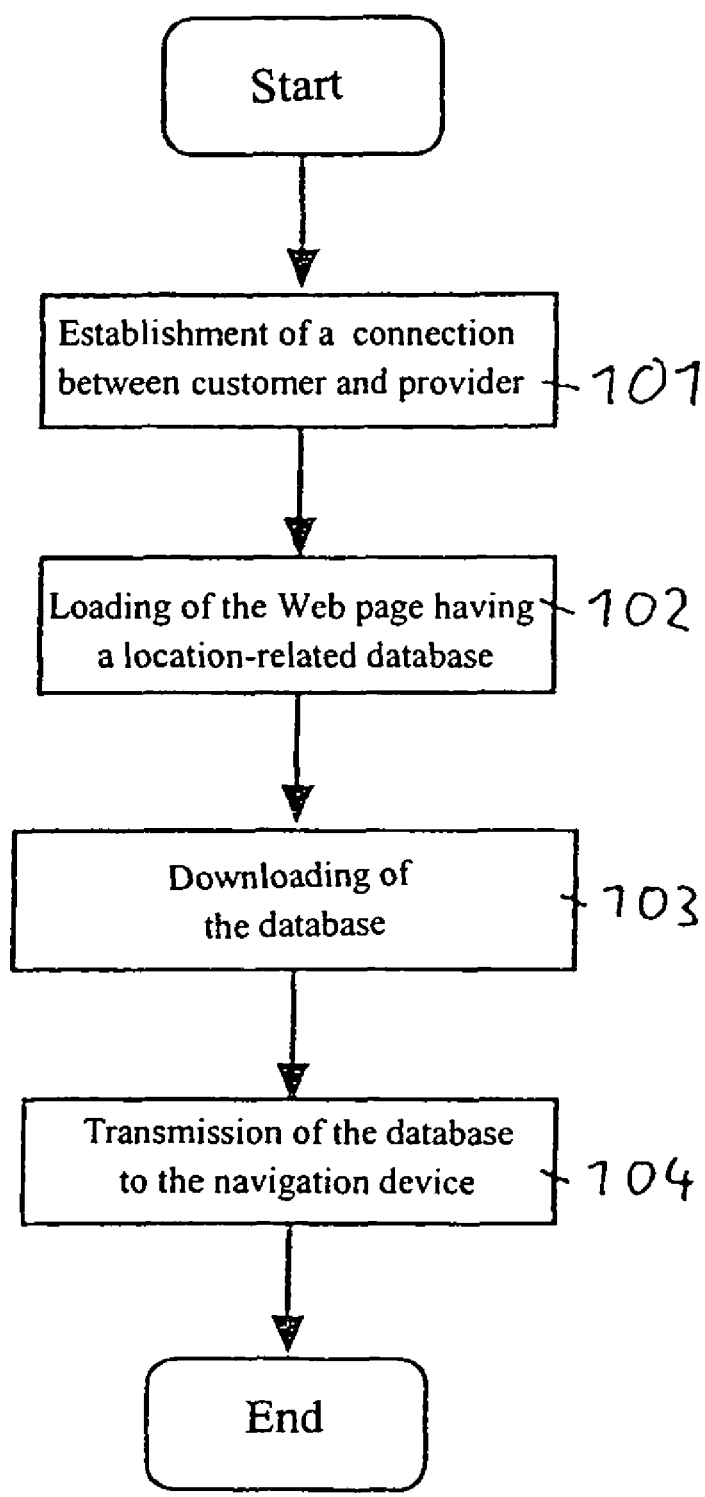
FIG. 8 shows a flow chart of the method according to the present invention for transmitting location-related information.

The flow chart of FIG. 8 shows the essential steps of the method according to the present invention for transmitting location-related information. In step 101, the customer establishes a connection between his/her computer and the server on which an Internet page of the service provider or of the information provider is located. In step 102, the customer loads the Internet page of the service provider or information provider. From this Internet page it is possible to access a database having location-related information. In another embodiment of the present invention, the customer must first follow a link to reach the database having location-related information. In step 103, the customer downloads the database having the location-related information.

In step 104, the data is transferred from the customer's computer to his/her navigation device. The transfer may be made via a connection of the navigation device to the Internet or via a transportable storage medium such as a diskette. Different embodiments of the present invention have to be seen in connection with different financing models.

Case 1: The information provider pays for the service of the service provider. Such financing is appropriate if the information provider has an interest in the user obtaining the offered information. The information provider might be, for example, a restaurant owner and the user a prospective guest. The restaurant owner might pay the service provider one time for encoding the location of the restaurant. It then makes sense that the access to the database having the location-related information is made directly via the home page of the restaurant owner.

Access might also take place via a link on the home page of the restaurant owner, which directs the customer to the Internet page of the service provider. This constellation is appropriate if the service provider and information provider have not arranged a one-time payment but instead a use-based payment. If the database having the location-related information is found on an Internet page of the service provider, the service provider has the possibility to monitor use. An update of the database may involve a low expense.

Case 2: The user pays the service provider for the service. In this constellation, the service provider and the information provider might also be one and the same party. The service provider might have an interest in providing information in the interest of generating income.

It is then appropriate that user access to the database having the location-related information is provided via an Internet page of the service provider. Of course, it is also possible for the user to reach the Internet page of the service provider only via a page referring to the location-related information. Either a flat rate or a use-dependent payment may be stipulated for usage. The user must be identifiable, for example, directly through the user name and password or indirectly. Identification by user name and password is appropriate in particular if a flat rate has been established between the service provider and user. A use-based payment may also be achieved by selecting the user under a specified number.

Case 3: The service is financed by advertising. It is possible to implement such financing easily if the user must access an Internet page of the service provider. In this alternative, the user automatically opens advertised offers as soon as the Internet page of the service provider is loaded. Hybrids of all three cases are also possible.

A LIST OF REFERENCE SYMBOLS IS AS FOLLOWS

Traffic route network 1
Interpolation points 2
Stretch elements 3
Object to be decoded 4
Interpolation points 5
Stretch elements 6
End point 7
Stretch element 8
Interpolation point 9
Equidistant points 10
Equidistant points 11
Grid 12

What is claimed is:

1. A method for transmitting location-related information from a transmitter to a receiver, the method comprising:
    downloading the location-related information onto the receiver from an Internet page, the location-related information including a linear object formed by at least one line segment;
    dividing the linear object into a first set of equidistant coordinate points, wherein a traffic route network stored within a digital map of the receiver is divided into a second set of equidistant coordinate points;
    for at least one point within the first set of points and for a plurality of potential displacement values, calculating the total number of points in the second set of points that lie within a predetermined radius of the at least one point after the linear object has been shifted according to each displacement value;
    selecting the displacement value corresponding to the greatest of the calculated totals;
    matching a portion of the traffic route network to the linear object by decoding the linear object in accordance with the selected displacement value; and
    updating the digital map with the decoded linear object.

2. The method of claim 1, the location-related information being offered on an Internet portal of a service provider in return for payment.

3. The method of claim 1, further comprising:
    selecting a link to an Internet page of an information provider to reach the Internet page of a service provider having the location-related information; and
    providing payment by the information provider to the service provider for the download of the location-related information.

4. The method of claim 3, the payment amount being calculated as a function of a data set of the location-related information.

5. The method of claim 1, the provision of the location-related information on the Internet page being financed at least partially by advertising.

6. The method of claim 1, wherein for an encoding of objects in a traffic route network, the object to be encoded being provided with at least one coordinate chain which at least partially lies on traffic routes which are also included in the receiver's database, and which includes characteristic properties of parts of the traffic route network.

7. The method of claim 6, wherein for a decoding, the coordinate chain of an encoded object is compared to the receiver's database, the at least one coordinate chain is assigned to the similar part of the traffic route network if similarities are present, and the non-assigned parts of the at least one coordinate chain are connected to the traffic routes of the receiver's database according to the geometric position of the assigned part.

8. The method of claim 1, wherein a data packet to be transmitted separately includes both location information and descriptive information, and the data packet has assignment information for assigning at least one part of the location information to at least one part of the descriptive information.

9. A navigation device comprising:
a digital road map; and
a receiving arrangement to receive location-related information which can be downloaded from an Internet page and included in the digital road map, the navigation device being configured to perform the following:
    download the location-related information onto the receiving arrangement from an Internet page, the location-related information including a linear object formed by at least one line segment;
    divide the linear object into a first set of equidistant coordinate points, wherein a traffic route network stored within the digital road map is divided into a second set of equidistant coordinate points;
    for at least one point within the first set of points and for a plurality of potential displacement values, calculate the total number of points in the second set of points that lie within a predetermined radius of the at least one point after the linear object has been shifted according to each displacement value;
    select the displacement value corresponding to the greatest of the calculated totals;
    match a portion of the traffic route network to the linear object by decoding the linear object in accordance with the selected displacement value; and
    update the digital road map with the decoded linear object.

10. The navigation device of claim 9, wherein reception occurs via a connection to a device having an Internet connection.

11. The navigation device of claim 9, wherein the location-related information is read in from a transportable storage medium.

12. The navigation device of claim 9, wherein the location-related information is received in a data packet that separately includes both location information and descriptive information, and that has assignment information for assigning at least one part of the location information to at least one part of the descriptive information.

13. The navigation device of claim 12, wherein reception occurs via a connection to a device having an Internet connection.

* * * * *